No. 691,156. Patented Jan. 14, 1902.
W. A. MAYBACH.
MEANS FOR ATTACHING AXLE SPRINGS TO VEHICLE FRAMES.
(Application filed Mar. 28, 1901.)
(No Model.)
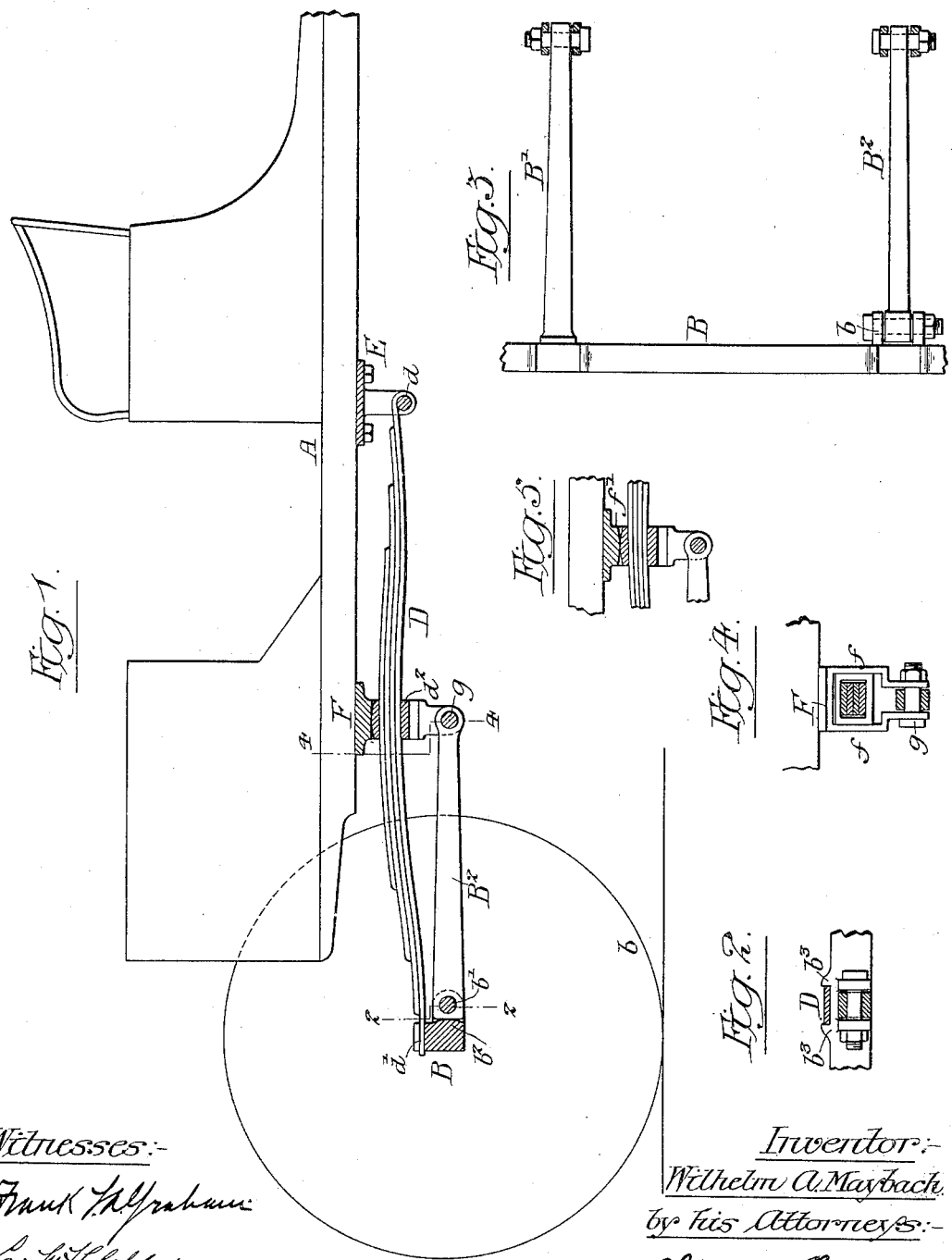
Witnesses:—
Frank J. Graham
Louis M. T. Whitehead
Inventor:—
Wilhelm A. Maybach
by his Attorneys:—
Hiram & Simon
THE NORRIS PETERS CO., PHOTO-LITHO., WASHINGTON, D. C.

UNITED STATES PATENT OFFICE.

WILHELM A. MAYBACH, OF CANNSTADT, GERMANY, ASSIGNOR TO DAIMLER MANUFACTURING COMPANY, OF NEW YORK, N. Y., A CORPORATION OF NEW YORK.

MEANS FOR ATTACHING AXLE-SPRINGS TO VEHICLE-FRAMES.

SPECIFICATION forming part of Letters Patent No. 691,156, dated January 14, 1902.

Application filed March 28, 1901. Serial No. 53,344. (No model.)

*To all whom it may concern:*

Be it known that I, WILHELM A. MAYBACH, a subject of the Emperor of Germany, and a resident of Cannstadt, in the Kingdom of Würtemberg, Germany, have invented certain Improvements in Means for Attaching Axle-Springs to Vehicle-Frames, of which the following is a specification.

Heretofore in arranging the supporting-springs of vehicles the springs were mounted on the axles at the center, and it is desirable in motor-vehicles to place the front axle as close to the front as possible, and in some instances beyond the front edge of the body is preferable, so that the free ends of the springs extend beyond the end of the body of the vehicle and beyond the axle, giving the vehicle an objectionable appearance.

The object of my invention is to so arrange the springs in respect to the axle and vehicle-body that the extreme forward ends of the springs will rest upon the axle, while the rear ends of the springs are connected to the body or vehicle structure, and the main weight of the vehicle is supported by the center of the spring, so that the greater portion of the spring is under the vehicle even when the front axle is placed beyond the end of the vehicle.

In the accompanying drawings, Figure 1 is a side view, partly in section, of sufficient of an automobile vehicle to illustrate my invention. Fig. 2 is a section on the line 2 2, Fig. 1. Fig. 3 is a plan view of the axle and its connection. Fig. 4 is a section on the line 4 4, Fig. 1. Fig. 5 is a view of a modification.

A is the frame or body of the vehicle.

B is the front axle, having wheels $b$. (Shown in diagram in Fig. 1.)

D is a semi-elliptical spring flexibly secured at $d$ to a bracket E, secured to the under side of the vehicle-body, while the opposite end $d'$ rests upon the axle B. The axle is provided with ribs which confine the spring laterally, as clearly shown in Fig. 2. The leaves of the spring are confined at the center by a strap $d^2$. The upper surface of this strap is rounded, as clearly shown in Fig. 1, and rests against a bearing-surface on a bracket F, which is secured to the under side of the vehicle-body. In some instances, as shown in Fig. 5, the bearing-surface F may have a curved face $f'$, and the upper surface of this strap $d^2$ may be also curved or may be straight, as desired. By means of the arched or curved surfaces the turning of the spring relative to the vehicle, due to the vibrations of the spring, is made possible. The bracket F has arms $ff$, as shown in Fig. 4, which prevent movement of the spring, and these arms are extended to form bearings for the pin $g$, which couples the rearwardly-extending arms B' B² of the axle B to the vehicle-body. I preferably secure the arm B' rigidly to the axle B, while the arm B² is pivoted thereto, as shown in Figs. 1 and 3, by means of a pin $b'$. The end of this arm B² is square, as shown, and rests against a rounded projection $b^2$ of the axle in order to prevent an unbalancing or oblique position of the vehicle when one end of the axle is raised higher than the other.

In order to hold the axle in a relative position in respect to the vehicle-body and to allow the spring to have free movement, I connect the axle to the vehicle-body by the arms B' B², as above described, so that even if the spring should break the axle would be connected to the body.

While I have shown the arms B' B² terminating at the bearing F, they may extend beyond the bearing or stop short of the bearing and be connected to independent brackets, if desired, without departing from my invention.

I claim as my invention—

1. The combination in a vehicle of a body, an axle mounted in advance thereof and semi-elliptical springs extending under the body, one end of each spring being attached to the same and the opposite end of each spring being attached to the axle, said body having brackets resting upon the centers of the springs, said brackets being provided with arms extending around the springs, a non-resilient piece connecting each of the said brackets and the axle, said arms of the brackets extending below the springs and being provided with pins for the attachment of said non-resilient pieces, substantially as described.

2. The combination of a vehicle frame or body, a front axle extending beyond the front of the vehicle-body, a semi-elliptical spring pivoted to a bracket, the outer end of the spring resting upon the axle, a strap on said spring, a bearing against which the strap rests, said bearing having arms acting as guides for the spring, and arms extending rearwardly from the axle and coupled to the arms of the bearing, one of said arms being pivotally connected to the axle, substantially as described.

3. The combination of a vehicle-body, brackets attached to the bottom thereof, an axle having wheels, leaf-springs confined at the center by a strap having one of its surfaces rounded, one end of each of the springs bearing upon the axle and the other end pivoted to one of the brackets, a second bracket bearing upon the curved surface of the strap and a relatively non-resilient bar connecting the second bracket to the axle, substantially as described.

4. In a device of the character described, the combination of a vehicle-body provided with two sets of brackets on the under side thereof, an axle having wheels, a bar rigidly fixed to said axle and a second bar pivoted to the axle, both of said bars being pivoted to the brackets of one of said sets, and two springs extending over said bars each having one end fixed to the axle and the other end fixed to the second set of brackets, the brackets to which said bars are attached bearing upon said springs at approximately the middle part thereof, substantially as described.

In testimony whereof I have signed my name to this specification in the presence of two subscribing witnesses.

WILHELM A. MAYBACH.

Witnesses:
WM. HAHN,
HR. REICHARDT.